United States Patent [19]

Mori

[11] Patent Number: 4,984,880
[45] Date of Patent: Jan. 15, 1991

[54] LIGHT REFLECTING DEVICE WITH SYMMETRICALLY DISPOSED LIGHT REFLECTING PLATES

[76] Inventor: Kei Mori, 3-16-3-501, Kaminoge, Setagaya-ku, Tokyo, Japan

[21] Appl. No.: 480,405

[22] Filed: Feb. 15, 1990

[30] Foreign Application Priority Data

Jul. 31, 1989 [JP] Japan .................................. 1-198791

[51] Int. Cl.⁵ ........................ G02B 7/198; G02B 5/08; G02B 17/00
[52] U.S. Cl. .................... 350/616; 350/639; 350/486; 350/264; 350/574; 126/417; 362/32
[58] Field of Search ............... 350/639, 616, 486, 574, 350/633, 264; 126/417; 362/32, 297

[56] References Cited

U.S. PATENT DOCUMENTS

| | | | |
|---|---|---|---|
| 4,699,448 | 10/1987 | Mori | 350/264 |
| 4,709,304 | 11/1987 | Mori | 362/32 |
| 4,709,999 | 12/1987 | Mori | 362/36 |
| 4,740,048 | 4/1988 | Mori | 362/32 |

FOREIGN PATENT DOCUMENTS 488652  1/1930  Fed. Rep. of Germany ...... 350/616

*Primary Examiner*—Jon W. Henry
*Attorney, Agent, or Firm*—Jordan and Hamburg

[57] ABSTRACT

A light reflecting device capable of independently or synthetically using light rays delivered by at least two light-guide cables and of selectively changing the amount of light rays in accordance with the conditions of the object to be radiated, is described. The device has a pair of light-reflecting plates disposed symmetrically about the center axis and facing in opposite directions. Each of the plates are inclinably, rotatably and integrally mounted. Futhermore the device has a driving means for moving the pair of reflecting plates back and forth in the direction of their reflecting surfaces and a pair of mounting means for mounting the corresponding light sources for radiating parallel light rays toward the corresponding reflecting surfaces of the reflecting plates and along the reflecting plates' shifting axis.

3 Claims, 5 Drawing Sheets

LIGHT REFLECTING DEVICE WITH SYMMETRICALLY DISPOSED LIGHT REFLECTING PLATES

BACKGROUND OF THE INVENTION

The present invention relates to a light-reflecting device which receives light transmitted through a light-guiding cable and which effectively diffuses and radiates the same outwardly.

The present applicant has previously proposed various methods and systems to focus solar rays or artificial light rays by using lenses or the like to guide the focused light rays into a light-guiding cable and to transmit them to wherever the light is needed for illumination or for other purposes, as for example, to supply light energy for the photosynthesis of plants being cultivated in a controlled environment etc.. However, in the case of utilizing light energy for plant cultivation there arises the following problem. When light rays are supplied from the end of a light-guiding cable, they can be radiated only within a small angle of about 46° since a light-guiding cable has a predetermined numerical aperture. Therefore, in such circumstances, desirable light radiation may not be obtained i.e. if the light is directly emitted from the end of the fiber optic cable. In order to solve this problem, the present applicant has also proposed various kinds of light radiators which can effectively diffuse light rays transmitted through a light-guiding cable and which can radiate the same over any desired area.

The present applicant has previously proposed a light-reflecting device comprising a light-guiding cable, a tubular body and a runner. In the tubular body, with at least one transparent side wall, two rails are installed extending in the axial direction thereof as well as a runner which travels along said rails. The runner is composed of wheels for traveling on the rails, a running body mounted on the wheels, a motor mounted on the body for driving the running wheels and a reflecting plate. Light emitted from the light-guide into the tubular body is reflected by the reflecting plate and radiated out of the tubular body through the transparent wall portion. The rails are made of a conductive material and sliders are in contact with these rails respectively. By changing the polarity of the voltage being applied between the rails, the motor is forced to rotate in the reverse direction causing the runner to reciprocate inside the tubular body. The above-mentioned device is able to more effectively diffuse and more widely radiate light emitted from a light-guide cable and its runner is easy to be driven. However, it has the drawback that the intensity of the light radiation is constant and cannot be increased when any object requires more intensive light radiation.

SUMMARY OF THE INVENTION

It is an object of the present invention to provide a light-reflecting device which is capable of independently or synthetically using light rays delivered by at least two light-guide cables and of selectively changing the amount of light rays in accordance with the nature of the object to be radiated, for example, the kinds of plants being cultivated, the conditions for their growth etc., thereby assuring more effective cultivation.

DESCRIPTION OF THE PREFERRED EMBODIMENTS

Figure 1:
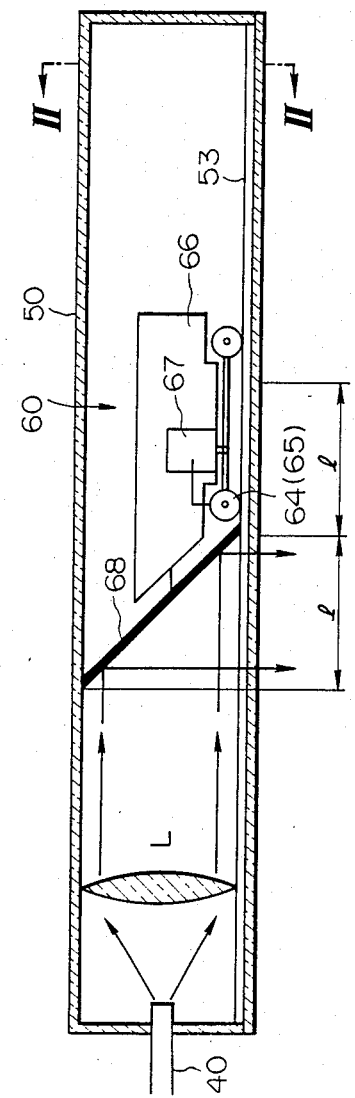
FIG.1 is a view for explaining an example of the prior art.
Figure 2:
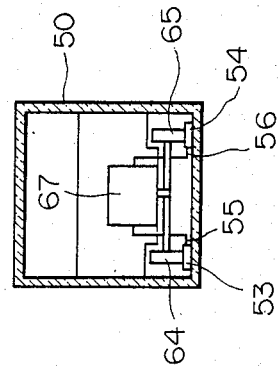
FIG.2 is a view taken on line II—II of FIG.1.

FIG.1 is a sectional side view for explaining an example of a light-reflecting device previously proposed by the present applicant. FIG.2 is a sectional view taken along line II—II in FIG.1. In FIGS.1 and 2, 40 is a light-guiding cable, 50 is a tubular body and 60 is a runner. In the tubular body 50, with at least one transparent side wall two rails 53 and 54 are installed extending in the axial direction thereof as well as a runner 60 which travels along said rails. The runner 60 is composed of wheels 64 and 65 for traveling on the rails 53 and 54, a running body 66 mounted on the wheels, a motor 67 mounted on the body 66 for driving the running wheels and a reflecting plate 68. Light "L" emitted from the light-guide 40 into the tubular body 50 is reflected by the reflecting plate 68 and radiated out of the tubular body through the transparent wall portion. In the case shown, the rails 53 and 54 are made of a conductive material and sliders 55 and 56 are in contact with these rails 53 and 54 respectively. By changing the polarity of the voltage being applied between the rails, the motor 67 is forced to rotate in a reverse direction causing the runner 60 to reciprocate inside the tubular body. While in the device shown light enters into the tubular body 50 from one side only, it may be possible also to introduce light into the tubular body from the opposite side and to provide an additional reflecting plate opposite the reflecting plate 68. As described later, the device, according to the present invention, is provided with a reflecting plate on the opposite side.

Although in the device shown a tubular body 50 made up of a square cross section is used, it may be cylindrical in which the rails 53 and 54 and the runner's body are disposed at the upper part thereof and having a slit in the axial direction at the upper part thereof and an arm extending through the slit for supporting the reflecting plate. The cylindrical body may allow the rotation of the reflecting plate 68 while the runner with the reflecting plate reciprocates therein. This makes it possible to radiate light rays within a wider radius. As will be mentioned later, the device, according to the present invention, has reflecting plates that move forward and backward while being rotated. When the runner moves stepwise by a distance of "L" corresponding to the length of the projection line of the inclined reflecting plate and said reflecting plate is rotated at each stop point of the runner, the light's radiation is equally distributed. In the foregoing description the inclined reflecting plate is installed inside the tubular body but if the surrounding air is clean, the cleaning of the reflecting plate is made easy. It is also possible to use the reflector without the tubular body in such a way that a runner suspending the reflecting plate by its hanger arm moves on the rail and the reflecting plate is rotated by a driving mechanism (motor) mounted on the hanger arm. The above-mentioned device is able to more effectively diffuse and more widely radiate light emitted from a light-guiding cable and its runner is can be easily driven. However, the drawback of that method is that the intensity of the light radiation is constant and cannot be increased when an object requires more intensive light radiation.

Figure 3:
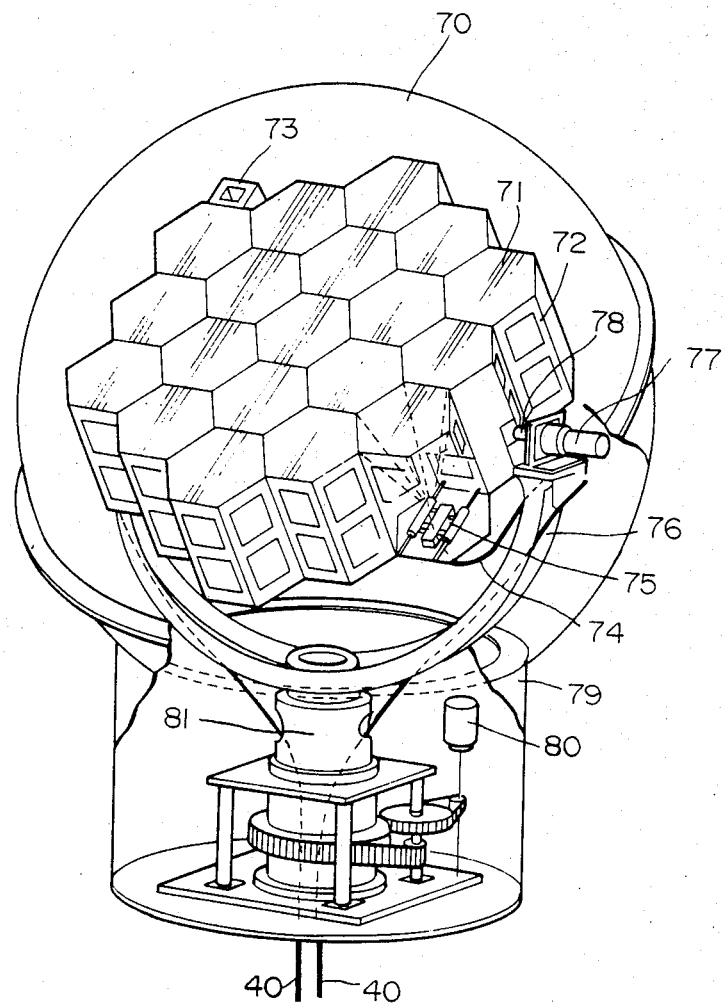
FIG.3 is a view for explaining an embodiment of a solar ray collecting device used in the present invention.

FIG. 3 is a construction view illustrating, by way of example, a solar ray collecting device previously proposed by the present applicant. In FIG. 3, numeral 70 is a transparent protective capsule, 71 is a Fresnel lens, 72 is a lens holder, 74 is a fiber optic cable consisting of a number of optical fibers located on the focal plane of the Fresnel lens, 75 is a fiber optic cable holder, 76 is an arm, 77 is a pulse motor, 78 is a horizontal shaft to be rotated by said pulse motor 77, 79 is a base for mounting the protective capsule 70 thereon, 80 is a pulse motor, 81 is a vertical shaft to be rotated by said pulse motor 80, and 40 is a bundle of fiber optic cables 74.

The direction of the sun is detected by means of the solar position sensor 73 and its detection signal which controls the pulse motors 77 and 80 for rotating the horizontal shaft 78 and 81 respectively so as to always direct said solar position sensor 73 toward the sun, and the sunlight focused by each lens 71 is guided into the corresponding light guide 74 through its end surface set at the focal point of said lens. The light-guides 74, with their end faces placed at the corresponding focal planes of the lens, are bundled together in a fiber optic cable 72 which is led out from the solar ray collecting device and laid wherever the light is needed for illumination, the cultivation of plans, the nurturing of animals, for sunbathing etc.

Figure 4:
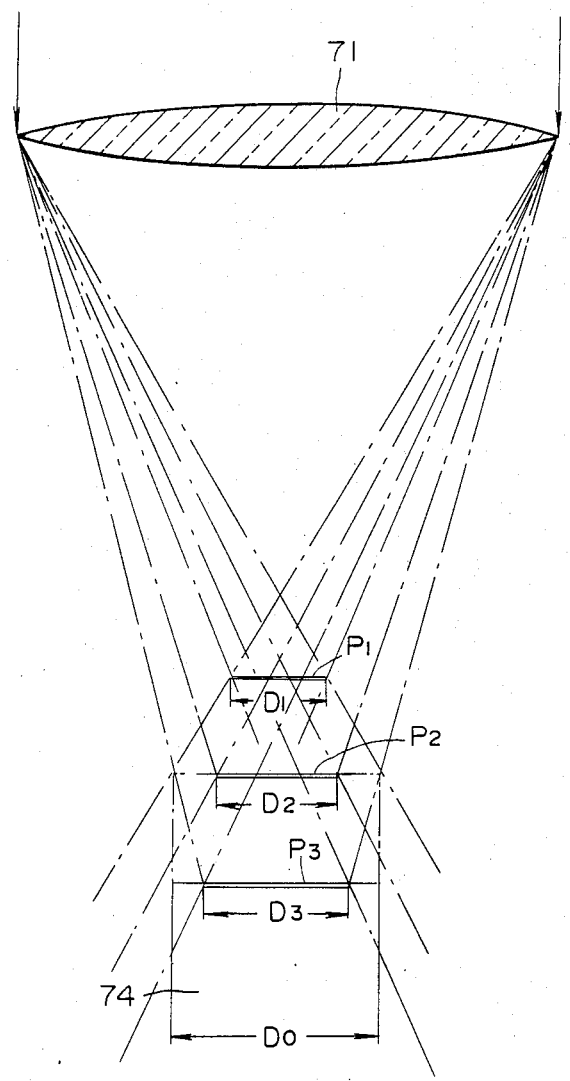
FIG.4 is a view for explaining a principal for guiding the sunlight into a light-guiding cable.

FIG. 4 is a view for explaining how to guide the light rays collected by the lens 71 into the light-guide.

In FIG. 4, 71 is a Fresnel lens or the like and 74 is a light-guide for receiving the sunlight focused by said lens and for transmitting the same there-through to any desired place. In the case of focusing the sunlight through the lens system, the solar image has a central portion consisting of almost white light and a circumferential portion containing therein a large amount of the light components having wave-lengths that correspond to the focal point of the lens system. Namely, in the case of focusing sunlight through the lens system, the focal point and the size of the solar image will vary in accordance with the component wave-lengths of the light. For instance, the blue color light having a short wave-length makes a solar image of diameter D1 at position P1. Furthermore, the green color light makes a solar image of diameter D2 at position P2 and the red color light makes a solar image of diameter D3 at position P3.

Consequently, as shown in FIG. 4, when the light-receiving end-surface of the light-guide is set at position P1, it is possible to collect sunlight containing plenty of the blue color components at the circumferential portion thereof. When the light-receiving end-surface of the light-guide is set at position P2, it is possible to collect sunlight containing plenty of green color components at the circumferential portion thereof. When the light-receiving end-surface of the light-guide is set at position P3 it is possible to collect sunlight containing plenty of red color components at the circumferential portion thereof. In each case, the diameter of the light guided can be selected in accordance with the light components to be collected. For instance, the required diameters of the light-guides are D1, D2 and D3, respectively, depending on the colors of the ligh rays desired, i.e. blue, green and red. In such a way, a certain amount of fiber optic cable can be saved and thereby the sunlight containing therein plenty of the desired color components can be collected most effectively.

And further, as shown in FIG. 4, if the diameter of the light-receiving end-surface of the fiber optic cable is enlarged to D0, it may be possible to collect light containing therein all of the visible wavelength components but not containing ultraviolet and infrared rays.

It is also possible that the light-receiving surfaces of the light-guides 74 can be fixed at the focal plane of the lens system beforehand by a manufacturer or said light-receiving surfaces of the light-guides can be adjustable in the light and in the direction of the axis of the lens system and regulated by the user so as to obtain the desired colored light.

As mentioned above, when the sunlight is focused through a lens system, the solar image has a central portion full of white color light and a circumferential portion, the content of which varies depending upon the distance from the lens system. Namely, at a short distance from the lens system, blue colored light is gathered in the circumferential portion and at a large distance from the lens system red colored light is gathered in the circumferential portion. By adjusting the set position of the light-receiving faces of the light-guides it is possible to eliminate infrared and ultraviolet rays from the sunlight and thus obtain sunlight that is suitable for sunbathing and for cultivating animals and plants.

The above-mentioned solar ray collecting device is installed on a roof and the sunlight collected by said device is transmitted through a fiber optic cable into a room wherein the light is used, as mentioned below in connection with the present invention.

In order to realize the above-mentioned purpose the present invention was made to provide a light reflecting device which comprises a pair of light reflecting plates disposed symmetrically about the center axis and facing in opposite directions, each of said plates being inclinably, rotatably and integrally mounted, a driving means for moving said pair of reflecting plates back and forth in the direction of their reflecting surfaces and a pair of mounting means for mounting the corresponding light sources for radiating parallel light rays toward the corresponding reflecting surfaces of the reflecting plates along the shifting axis of the reflecting plates. An embodiment of the present invention is explained hereinafter with references to the accompanying drawings.

Figure 5:
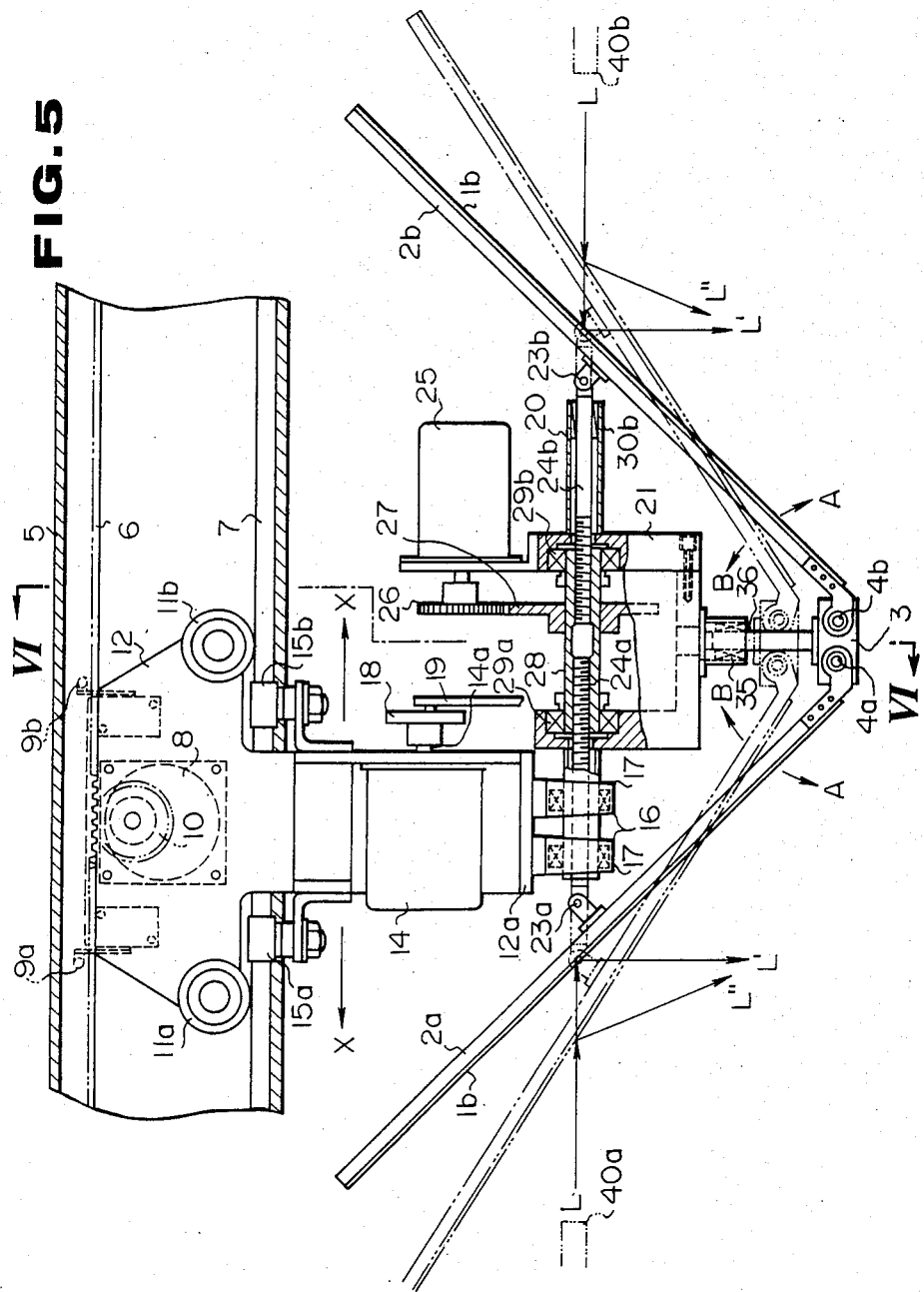
FIG.5 is a construction side view for explaining a light reflector embodying the present invention.
Figure 6:
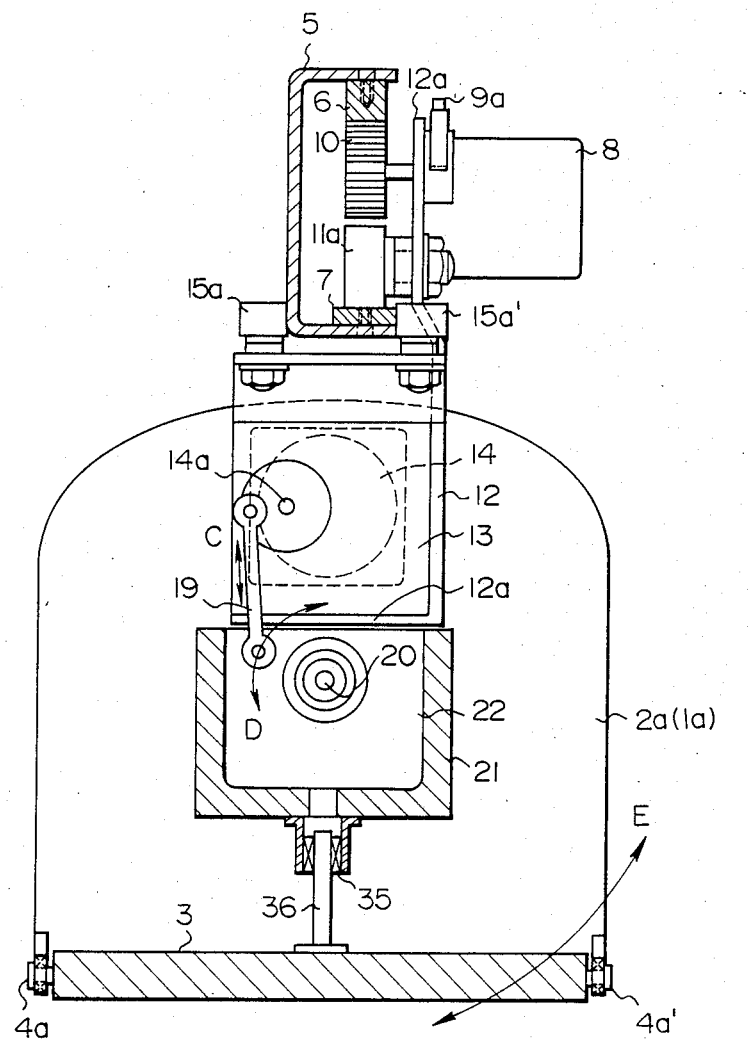
FIG.6 is a view taken on line VI—VI of FIG.5.

FIG. 5 is a side view for explaining a light reflecting device embodying the present invention. FIG. 6 is a view taken along line VI—VI of FIG. 5. In FIGS. 5 and 6, the reflecting plates 1a and 1b are fixed respectively on the reinforcing plates 2a and 2b which in turn are rotatably secured to a base block 3 with pins 4a and 4b respectively at one side as shown in FIG. 5 and with pins corresponding to the pins 4a and 4b at the opposite side in such a way that the reinforcing plates may rotate in the direction of arrow A or arrow B. A beam 5 having a U-shaped section is laid over the given span of the ceiling or a similar structure and firmly secured thereon. A rack 6 is fixed to the upper inside surface of the overhead beam 5 and rails 7 are fixed thereon the full length extending to the lower inside surface of the overhead beam 5. A geared motor 8, limit switches 9a and 9b, a pinion 10 engaging with the rack 10 and rollers 11a, 11b are integrally attached to the base plate 12 which extends downward from the overhead beam 5 and is bent to form a horizontal portion 12a. A plate member 13 is integrally and perpendicularly joined by welding or any other suitable method to the lower portion of the base plate 12 at a place under the overhead beam 5 in order to provide a mounting surface for securing the geared motor 14 thereto. The base plate 12 is also provided with guide rollers 15a, 15a', 15b, 15b' which are integrally attached to the base plate 12 and clamped onto the overhead beam 5 from back to front to securely hang the base plate 12 from the overhead beam 5. On the lower surface of the horizontal portion 12a of the base plate 12 are attached hanger arms 16 wherein a shaft 20 mentioned later is rotatably held by using bearings 17. A rotary plate 18 is fitted onto the driving shaft 14a of the geared motor 14 and the end of a crank 19 is eccentrically attached to the rotary plate. The other end of said crank 19 is secured to the side wall 22 of a box 21. Accordingly, when the motor 14 rotates, the crank 19 moves in the direction of arrow C and the box 21 rotates about the axis 20 in the direction of arrow D to cause the rotation of the base block 3 with the reflecting plates 1a and 1b about a hollow shaft 20 in the direction of arrow E. Namely, the reflecting plates revolve in the same way that the reflecting plate 68 of the prior device revolves as mentioned before with reference to FIG.3. The reinforcing plates 2a and 2b are connected with inclination adjusting bolts 24a and 24b respectively through the connecting elements 23a and 23b. On the upper part of the box 21, a geared motor 25 is provided, the rotation of which is transmitted through the gears 26 and 27 to a revolution shaft 28 on which the gear 27 is fitted. The revolution shaft 28 is a hollow shaft having inner threads for engaging with the above-mentioned inclination adjusting bolts 24a and 24b and supported by bearings 29a and 29b in the box 21. The hollow shaft 20 has thrust bearings 30a (not shown) and 30b fitted therein to allow the axial movement of the adjusting bolts 24a and 24b. The adjusting bolts 24a and 24b have threads cut in reverse directions. Consequently, when the shaft 28 is rotated, the adjusting bolts 24a and 24b move in the opposite direction to cause the revolution of the reflecting plates 1a and 1b at the same time in the direction of arrow A or arrow B. In this case, a change in the vertical height of the connecting elements 23a and 23b in relation to the pins 4a and 4b is obtained. To absorb said change, a thrust bearing 35 is provided on the lower surface of the box. Namely, a pin 36 is vertically mounted on the base block 3 and is inserted at its upper end into the thrust bearing 35 to prevent the whole of the reflecting plates from rolling and also to absorb their vertical movement. Consequently, when light rays L from the light-emitting ends of the light-guiding cables 40a and 40b are emitted toward the reflecting plates in the same way as described in the prior art, ordinarily they may be reflected by the reflecting plates 1a and 1b in the direction of arrows L' and be radiated over the plants being cultivated in the corresponding area of radiation. In this case, the whole device travels in the direction of arrow X by the action of the motor 8 through the pinion 10 and rack 6 and at the same time the reflecting plates 1a and 1b are turned as the hollow shaft 20 is being driven by the motor 14 through the rotary plate 18 and the crank 19 to supply light rays to the plant in the same way as mentioned in the prior art. It is also possible to evenly supply light rays to the whole of the plants when the traveling pitch length per revolution of the reflecting plates is adjusted to the projecting length of the reflecting plates. Furthermore, according to the present invention, the reflecting plates 1a and 1b can be inclined in the direction of arrow A or arrow B by the motor 25 as for instance, when they are inclined in the direction of arrow A to the position shown by a broken line, light rays reflected by the reflecting plates propagate in the direction of arrows L" and L" to overlap with each other under the base block 3. Accordingly, more intensive light radiation, at any time of need, can be obtained by changing the inclination of the reflecting plates 1a and 1b so as to bring about the synthesis of the light rays reflected by them. By virtue of the features of the present invention, it becomes possible to supply light radiation of a variable intensity to plants being cultivated according to the kinds of plants being cultivated and the conditions necessary for their proper growth.

As is apparent from the foregoing description, according to the present invention, it may be possible to provide a light reflector which is capable of using light rays delivered by at least two light-guiding cables and of selectively changing the amount of light rays in accordance with the conditions necessary to the object being radiated as for example, the kinds of plants being cultivated, the conditions necessary for their growth etc., in order to assure more effective cultivation.

I claim:

1. A light reflecting device for reflecting light from light sources, comprising a pair of light-reflecting plates, disposed symmetrically about the center axis and facing in the opposite directions, each of said plates being inclinably, rotatably and integrally mounted, a driving means for moving said pair of reflecting plates back and forth in the direction of their reflecting surfaces and a pair of mounting means for mounting said light sources for radiating parallel light rays toward the corresponding reflecting surfaces of the reflecting plates and along the reflecting plates' shifting axis.

2. A light-reflecting device according to claim 1, characterized in that said paired light-reflecting plates are inclinable in the direction of their shifting axis.

3. A light-reflecting device according to claim 1 or 2, characterized in that said paired light reflecting plates are rotatable about their shifting axis.

* * * * *